(12) United States Patent
Kiciman et al.

(10) Patent No.: US 9,009,226 B2
(45) Date of Patent: Apr. 14, 2015

(54) GENERATING ACTIVITIES BASED UPON SOCIAL DATA

(75) Inventors: Emre Mehmet Kiciman, Seattle, WA (US); Chun-Kai Wang, Bellevue, WA (US); Yi-Min Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 438 days.

(21) Appl. No.: 12/633,798

(22) Filed: Dec. 9, 2009

(65) Prior Publication Data

US 2011/0137989 A1 Jun. 9, 2011

(51) Int. Cl.
*G06F 15/16* (2006.01)
*G06Q 30/02* (2012.01)

(52) U.S. Cl.
CPC ............ *G06Q 30/02* (2013.01); *G06Q 30/0251* (2013.01)

(58) Field of Classification Search
None
See application file for complete search history.

(56) References Cited

U.S. PATENT DOCUMENTS

| 7,788,245 | B1 * | 8/2010 | Eddings et al. ............... 707/705 |
| 7,954,058 | B2 * | 5/2011 | Kalaboukis et al. .......... 715/753 |
| 2005/0080674 | A1 * | 4/2005 | Howard .......................... 705/14 |
| 2007/0043583 | A1 | 2/2007 | Davulcu et al. |
| 2007/0105627 | A1 * | 5/2007 | Campbell ....................... 463/40 |
| 2007/0233692 | A1 * | 10/2007 | Lisa et al. ....................... 707/10 |
| 2009/0106270 | A1 * | 4/2009 | Shukla et al. ................. 707/100 |
| 2009/0112701 | A1 | 4/2009 | Turpin et al. |
| 2009/0138565 | A1 | 5/2009 | Shiff et al. |
| 2009/0192871 | A1 | 7/2009 | Deacon et al. |
| 2009/0254836 | A1 | 10/2009 | Bajrach |
| 2010/0094878 | A1 * | 4/2010 | Soroca et al. ................. 707/748 |
| 2011/0137989 | A1 * | 6/2011 | Kiciman et al. .............. 709/204 |

OTHER PUBLICATIONS

Google—NPL—Webmaster Tips 2001.*
"EveryZing Launches ezSEO", Feb. 27, 2008, Retrieved at <<http://www.altsearchengines.com/2008/02/27/everyzing-launches-ezseo/>>, pp. 1-5.
Grineva, et al., "Extracting Key Terms from Noisy and Multi-theme Documents", Apr. 20-24, 2009, Retrieved at <<http://www2009.org/proceedings/pdf/p661.pdf>>, pp. 661-670.
Glance, et al., "Deriving Marketing Intelligence from Online Discussion", Aug. 21-24, 2005, Retrieved at <<http://www.kamalnigam.com/papers/aw-kdd05.pdf>>, pp. 1-10.
Kola, et al., "Searching and Analysis of Text Streams" Oct. 21, 2009, Retrieved at << http://www.cse.iitk.ac.in/users/dilipkk/BTPsubmit/term1final.pdf>> pp. 1-6.

* cited by examiner

*Primary Examiner* — Brian P Whipple
*Assistant Examiner* — Keyvan Emdadi
(74) *Attorney, Agent, or Firm* — Sandy Swain; Judy Yee; Micky Minhas

(57) ABSTRACT

A method described herein includes acts of receiving data from a social networking application, wherein the data is generated by a first individual, and executing an entity extraction algorithm to extract at least one entity from the received data. The method also includes automatically causing a hyperlink to be displayed on a computing device utilized by a second individual, wherein the hyperlink is based at least in part upon the at least one entity, wherein the hyperlink is configured to direct the first individual to a search engine and is further configured to cause the search engine to execute a search that pertains to the at least one entity.

20 Claims, 13 Drawing Sheets

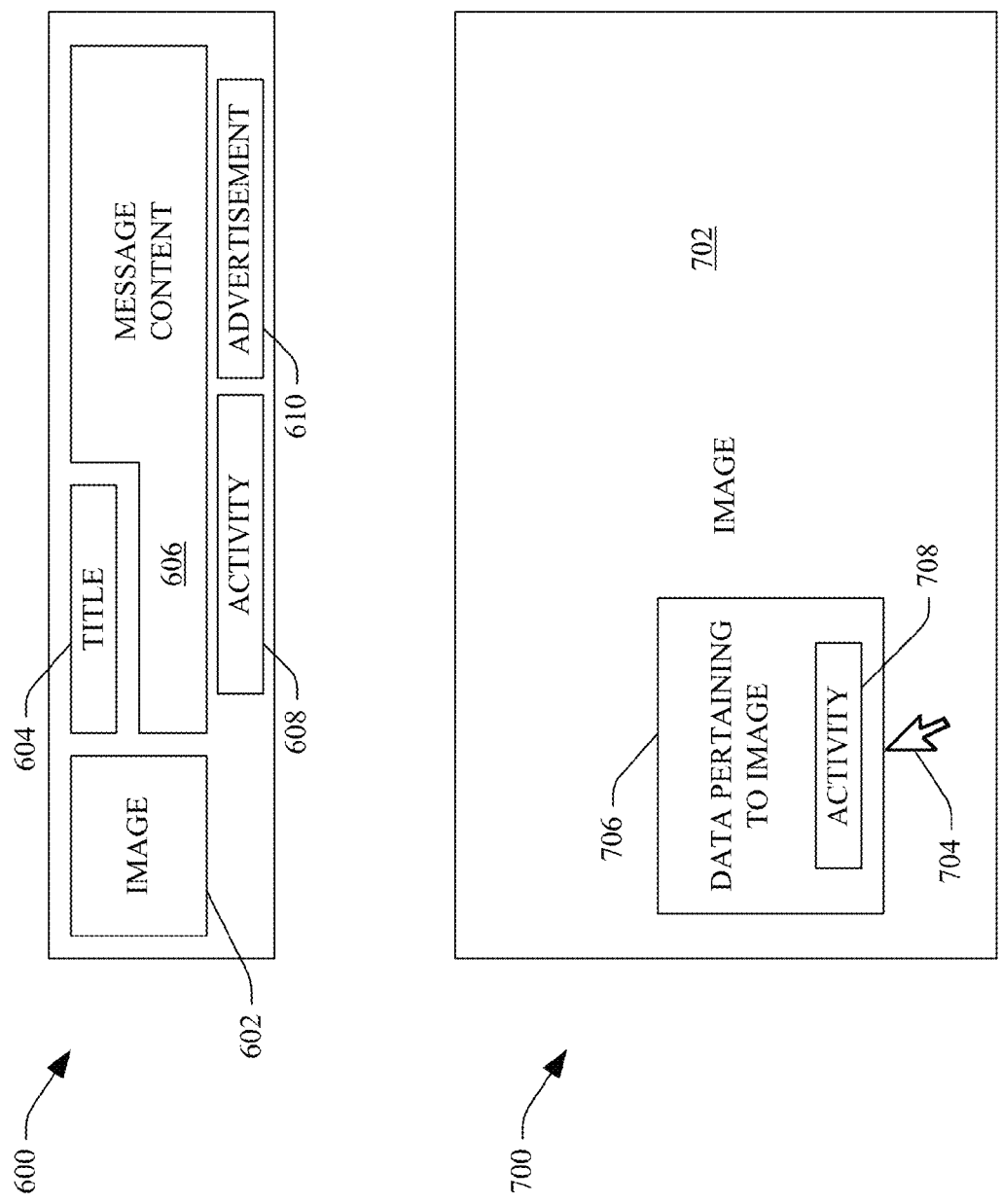

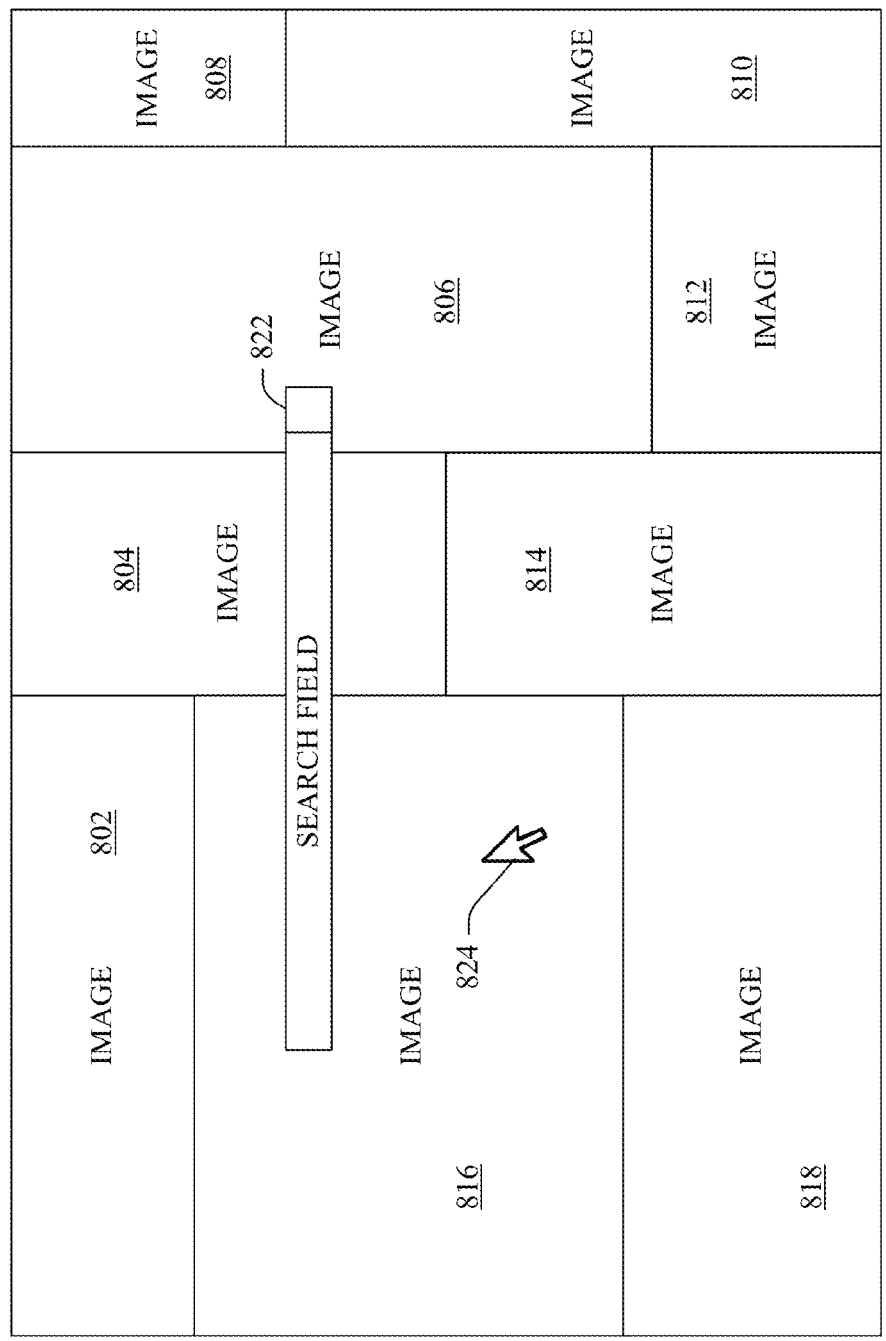

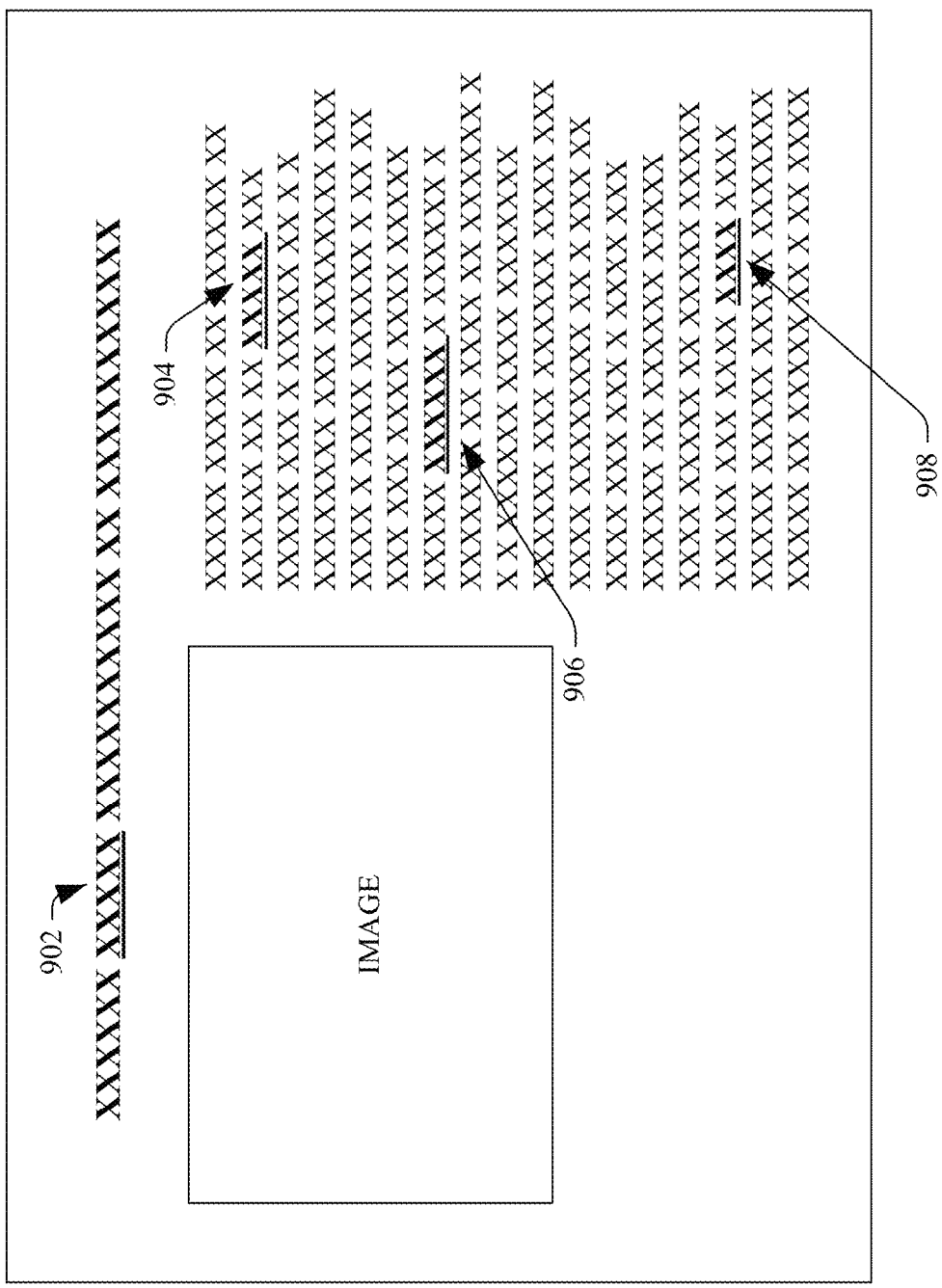

GENERATING ACTIVITIES BASED UPON SOCIAL DATA

BACKGROUND

Online social networking applications are becoming increasingly popular. People rely on such applications to keep in touch/interact with friends and family. Typically, to utilize such an online social networking application, an individual that logs into a web site that corresponds to the application will be provided a visual depiction of messages sent to the individual as well as status updates of contacts (friends) of the individual. Other mechanisms for sharing information with contacts, such as photographs and video, are also available on many online social networking applications.

While these online social networking applications are useful tools that allow people to interact with their contacts, oftentimes messages transmitted using social networking applications are relatively short with little context associated therewith. Thus, an assumption exists that an individual receiving a relatively short message will have some knowledge of what the sender of the message is referring to in the message. In some cases, however, without context a message may be difficult to comprehend by a reviewer of the message.

SUMMARY

The following is a brief summary of subject matter that is described in greater detail herein. This summary is not intended to be limiting as to the scope of the claims.

Described herein are various technologies pertaining to social networking activities of an individual. More particularly, described herein are various technologies pertaining to automatically providing activities that may be of interest to a recipient of social networking data, which may include a message, a photograph, a video, etc. An individual may have an account with one or more social networking applications, which may be any suitable online social networking application such as one where status updates can be shared, photographs can be shared, messages can be broadcast to "followers" of posters of the messages, an application that aggregates data from several social networking applications, etc.

Content of the social networking data such as text of a message, location data pertaining to a photograph or video, tags assigned to the photograph or video, etc. can be analyzed. Such analysis may include extraction of one or more entities pertaining to the social networking data. For instance, a keyword may be extracted from the social networking data and canonical meaning of such keyword can be ascertained via analyzing the contents of the social networking data and context associated therewith. In an example, the extracted keyword and associated canonical meaning can be referred to herein as an entity.

The entity extracted from the content of the social networking data may be compared with a plurality of predefined activities, wherein an activity may be a suggested search, an invitation to perform a particular task, a link to other information sources, etc. Based at least in part upon such comparison, an activity from the list of predefined activities may be selected. In an example, such activity may be represented by a hyperlink, wherein selection of such hyperlink can cause the activity to be undertaken. For instance, selection of such hyperlink directs the individual to a search engine and causes the search engine to perform a search pertaining to the activity or provide information pertaining to the activity, including directing the individual to a list of products that may be purchased, displaying a map of a region pertaining to the message, etc. Furthermore, each activity may have one or more template phrases associated therewith that can be utilized to present an understandable representation of the activity to an individual. Example activities represented through utilization of template phrases may include a suggestion such as "learn more about _____," "show _____ on a map," "buy tickets to see _____," "shop for _____," "do you know how tall _____ is," etc.

When selecting an activity from a plurality of different activities, such activities can be ranked according to any suitable criteria. For instance, the criteria may include closeness of a match between an entity extracted from social networking data and a predefined activity. Once the activity is selected the selected activity can be displayed in conjunction with the social networking data viewed by the individual.

As will be described in greater detail below, the social networking data may include an image shared with the individual by a contact of such individual. Entities may be extracted from such image via image analysis and/or through analyzing metadata corresponding to the image (e.g., a caption assigned to the image by an owner of the image, location data embedded in the image, tags assigned to the image, etc.). A suggested activity may be displayed in conjunction with the image (e.g., below the image) and/or may be displayed when the user selects the image, such as by causing a mouse pointer to hover over the image.

Other aspects will be appreciated upon reading and understanding the attached figures and description.

BRIEF DESCRIPTION OF THE DRAWINGS

FIG. 6 is an example graphical user interface that facilitates displaying an activity in conjunction with a relatively short social networking message received by an individual.

FIG. 7 is an example graphical user interface that displays data pertaining to an image and an activity associated with the image upon an individual selecting such image.

FIG. 8 illustrates an example collage that comprises images shared with an individual by social networking contacts of the individual.

FIG. 9 is an example graphical user interface that depicts content in a web page that is in some way related to social networking data received by the individual.

DETAILED DESCRIPTION

Figure 1:
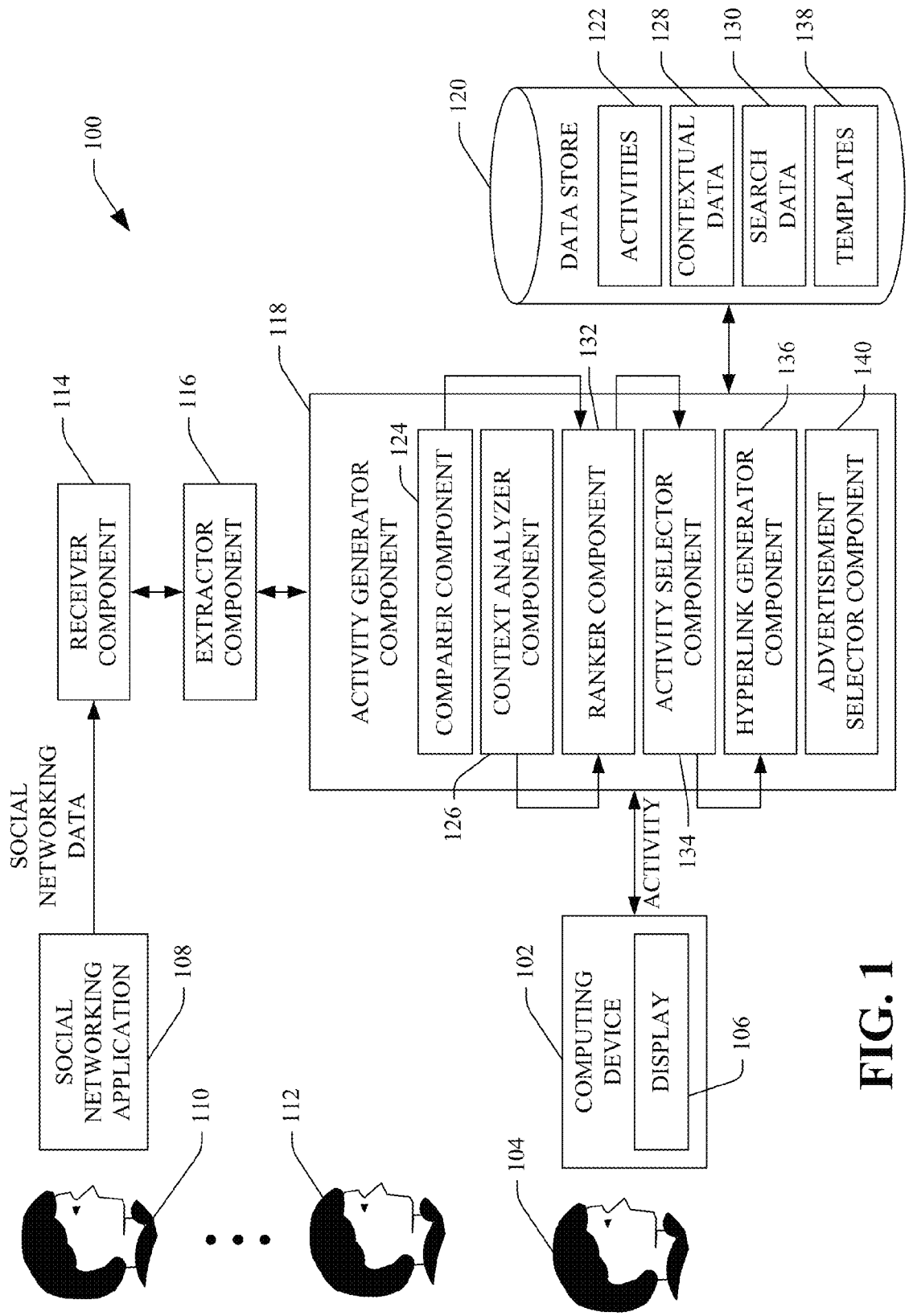
FIG. 1 is a functional block diagram of an example system that facilitates providing an activity to an individual based at least in part upon contents of social messaging data being viewed by the individual.

Various technologies pertaining to automatically selecting and providing an activity to an individual that is somehow related to social messaging data received by such individual will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates selecting and providing an activity with respect to social networking data received by an individual is illustrated. The system 100 comprises a client computing device 102 that is employed by an individual 104, for instance, to browse the Internet through utilization of an Internet browser installed on the computing device 102. The computing device 102 comprises a display 106 that can be utilized in connection with displaying web pages loaded by the browser to the individual 104. A social networking application 108 may be in communication with the computing device 102 by way of a network such as the Internet. The individual 104 may cause the client computing device 102 to transmit user authentication data to the social networking application 108, such as a user name and password that correspond to the individual 104. Of course, other types of user authentication data are contemplated and intended to fall under the scope of the hereto-appended claims.

A plurality of other individuals 110-112 may provide social networking data to the individual 104 by way of the social networking application 108. As used herein, social networking data may refer to a message transmitted by one of the individuals 110-112 to the individual 104, a status update of one of the individuals 110-112, an image desirably shared with the individual 104 (posted by one of the individuals 110-112), video desirably shared with the individual 104, etc.

Thus, the social networking application 108 may be an application that facilitates interaction amongst friends/colleagues such that one or more of the individuals 110-112 may provide updates about themselves which are automatically transmitted to a web page of the individual 104. In another example, the social networking application 108 may be a photograph sharing application such that one of the individuals 110-112 can upload a photograph and cause the photograph to be shared with the individual 104 via the social networking application 108. In still yet another example, the social networking application 108 may be a text broadcasting application that is configured to broadcast a limited number of characters of text to subscribers of a transmitter of a message. For instance, the individual 104 may choose to follow broadcasts made by the individual 110 and thus may receive the social networking data via the social networking application 108 from the individual 110. In still yet another example, the social networking application 108 may be an enterprise-wide application, wherein contacts of the individual 104 can be defined by e-mail lists, project groups corresponding to the individual 104, etc. and the social networking data may be documents shared amongst members of a certain project group or team, etc.

The system 100 further includes a receiver component 114 that receives social networking data from the social networking application 108, wherein the social networking data is authored or owned by one of the individuals 110-112 and is intended for the individual 104. Pursuant to an example, the receiver component 114 can receive social networking data intended for the individual 104 when such individual provides authentication data to the social networking application 108 through utilization of the computing device 102. In another example, the receiver component 114 can receive social networking data intended for the individual 104 as soon as the social networking application 108 receives such data.

An extractor component 116 can be in communication with the receiver component 114 and can analyze content of the social networking data and extract at least one entity based at least in part upon such analysis. In an example, the social networking data may comprise a message that includes text and the extractor component 116 can be configured to extract at least one keyword from such text. Based at least in part upon the keyword and context associated with such keyword, the extractor component 116 can ascertain a canonical meaning of the keyword. The keyword together with the canonical meaning can be referred to herein as an entity. In another example, the social networking data may include an image. In such a case, the extractor component 116 can analyze data corresponding to the image such as a title of the image, a caption provided to the image, geographic data pertaining to the image (e.g., embedded through use of GPS), tags assigned to the image, etc. The extractor component 116 may extract an entity based at least in part upon such analyzed data.

An activity generator component 118 can receive the entity extracted from the social networking data by the extractor component 116 and can select an activity to present to the individual 104 on the display 106 of the computing device 102 based at least in part on the extracted entity. A data store 120 comprises a plurality of predefined activities 122 and the activity generator component 118 can select an activity from the plurality of predefined activities 122 based at least in part upon the entity extracted by the extractor component 116. As will be described in greater detail herein, the activities 122 may include an invitation to perform a search to acquire additional data pertaining to the entity extracted by the extractor component 116, an invitation to shop for a product pertaining to the entity extracted by the extractor component 116, an invitation to receive a map of a location extracted by the extractor component 116, an invitation to search for a particular item such a plane tickets, an invitation to search for weather conditions pertaining to an entity, amongst other activities.

In an example, the activities 122 may be automatically or semi-automatically generated based upon observed actions of users of a search engine. For example, types of queries in combination with certain terms (entities) can be analyzed to ascertain what activities people typically perform with respect to such terms or objects represented by such terms. Additionally, how individuals search for information in combination with a city name, a person, a book title, a movie, etc. can be analyzed, and may be used to determine what activities people are interested in when they see a type of entity. Furthermore, activities in the activities 122 may be dynamically altering over time. For instance, a natural disaster may affect a large area, and thus the activity may be "see news about hurricane in _____".

The activity generator component 118 can comprise a comparer component 124 that can compare the entity extracted by the extractor component 116 with the activities 122 in the data store 120. For instance, the entity extracted by the extractor component 116 may correspond with a category, a label, etc. and the comparer component 124 can locate activities 122 in the data store 120 that have been assigned a substantially similar category, label, etc. For example, the social networking data may include the message "It is raining in New York." The extractor component 116 can extract the term "New York" from the message, and can determine a canonical meaning of such term (e.g., the city of New York). The entity (the city of New York) may be assigned a category of "location", and the comparer component 124 can compare such category with categories of activities. Based at least in part upon the comparison, the comparer component 124 can locate activities 122 in the data store that correspond to the entity (e.g., see weather in New York, see restaurants in New York, find tickets to shows in New York, . . .).

The activity generator component 118 may further include a context analyzer component 126, wherein the context analyzer component 126 can attempt to further refine selection of an activity. For instance, the context analyzer component 126 can access the data store 120 and review contextual data 128 retained in the data store 120 and/or may review other portions of the social networking data. The contextual data 128 may include data pertaining to known or inferred interests of the individual 104, data pertaining to activities of the individuals 110-112 that generated the social networking data, time of day, day of week, amongst other contextual data 128. Furthermore, continuing with the example provided above, the term "raining" in the social networking message can be reviewed by the context analyzer component 126, and the context analyzer component 126 can utilize such term to influence selection of the activity "see weather in New York." In an example embodiment, the context analyzer component 126 can analyze historical conversations with respect to the individual 104 and/or the individuals 110-112 that generated the social networking data. Of course, type of data that can be analyzed may subject to input of individuals (e.g., data labeled as private by the individual may not be analyzed). Additionally or alternatively, the context analyzer component 126 can access search data 130 retained in the data store 120, wherein the search data 130 may include data for particular searches undertaken by individuals, popularity of searches, user feedback pertaining to searches, etc. Such search data 130 may correspond to one or more of the activities 122 retained in the data store 120.

A ranker component 132 can receive comparison data generated by the comparer component 124 and contextual data analyzed by the context analyzer component 126 together with other features pertaining to the entity extracted by the extractor component 116 to generate a ranking of activities with respect to the entity extracted by the extractor component 116. Features that may be taken into consideration by the ranker component 132 may include identity of the poster of the social networking data, application utilized to generate the social messaging data, an amount of time since the individual 104 has reviewed or been given the opportunity to review the social networking data, etc. Of course, the ranker component 132 may take into consideration other features, including but not limited to current location of the individual 104, known interests of the individual, amongst other data.

An activity selector component 134 may select one or more of the activities based at least in part upon the rank of the selected activities amongst activities ranked by the ranker component 132. For instance, the activity selector component 134 may be configured to select a most highly ranked activity from the activities 122.

The activity generator component 118 may further include a hyperlink generator component 136, wherein the hyperlink generator component 136 is configured to automatically cause a hyperlink that is representative of the activity selected by the activity selector component 134 to be displayed in conjunction with the social networking data. As used herein, the term "hyperlink" is intended to encompass a textual hyperlink, a button, a list, or other suitable item that can cause an activity to be performed upon selection of such item by a user. For instance, the hyperlink generated by the hyperlink generator component 136 can be configured to direct the individual 104 to a search engine upon the hyperlink being selected by the individual 104. Additionally, the hyperlink generated by the hyperlink generator component 136 can be configured to cause the search engine to execute a search pertaining to the activity. The hyperlink generator component 136 can generate the hyperlink using one or more templates 138 that may be retained in the data store 120. Such templates 138 may be utilized to provide context pertaining to the activity represented by the hyperlink. Example templates may include templates such as "learn more about _____," "shop for _____," "buy tickets to see _____," "do you know _____ about _____," amongst other templates. Therefore, the individual 104 can ascertain what information or activity will be undertaken prior to selecting the hyperlink generated by the hyperlink generator component 136.

The activity generator component 118 may optionally include an advertisement selector component 140 that may select an advertisement to display in connection with the activity and in conjunction with the social networking data that is to be displayed on the computing device 102 to the individual 104. The advertisement selector component 140 may select an advertisement based at least in part upon, for instance, recommendations given by the poster of the social networking data, the entity extracted by the extractor component 116, contextual data and/or other suitable data.

Pursuant to an example, the extractor component 116 and the activity generator component 118 may be implemented as a plug-in to an Internet browser. In such a case, when the plug-in detects that the individual 104 has logged into the social networking application 108, the social networking data pertaining to such application can be analyzed and the hyperlinks can be generated and selectively placed on the display of the computing device 102. In another example, as will be shown in greater detail below, the social networking application 108 may be configured to transmit social networking data to the receiver component 114, the extractor component 116 and the activity generator component 118. Once the activity has been selected and the hyperlink generated, such data can be transmitted back to the social networking application 108 for display to the individual 104.

Various examples are now provided herein for illustrative purposes to describe example utilizations of the system 100. In a first example, the individual 104 may log in to a social networking application 108, wherein the social networking application 108 is configured to display a plurality of social networking messages to the individual 104. Displayed in conjunction with the social networking messages may be activities that can be selected by the individual 104 to gain additional context pertaining to the message or perform an activity related to the social networking message that is displayed to the individual. For example, the social networking message may be "I had a great time in Yosemite." Example activities that can be displayed in conjunction with such message may be "learn more about Yosemite," "provide a map of Yosemite," "tours of Yosemite," "lodging in Yosemite," amongst other activities. The activity shown to the individual 104 may be the activity that is found by the activity generator component 118 to be the most interesting to the individual 104 given the message and related context.

In another example, the social networking application 108 may be an application that is configured to allow individuals to share images with one another. The individual 104 can access a web page where shared images can be viewed. At least one of the shared images may have a caption that describes a location of the image (New York, N.Y.). Using the system 100 an activity pertaining to such image can be automatically generated based at least in part on such caption (and/or other data pertaining to the image). Such activity may be "restaurants in New York, N.Y.," "travel to New York," etc. As represented above, these activities can be represented by hyperlinks and the individual 104 can select such hyperlink to pursue the activity represented by the hyperlink. Other examples for utilization of the system 100 will be readily apparent to one skilled in the art.

Figure 2:
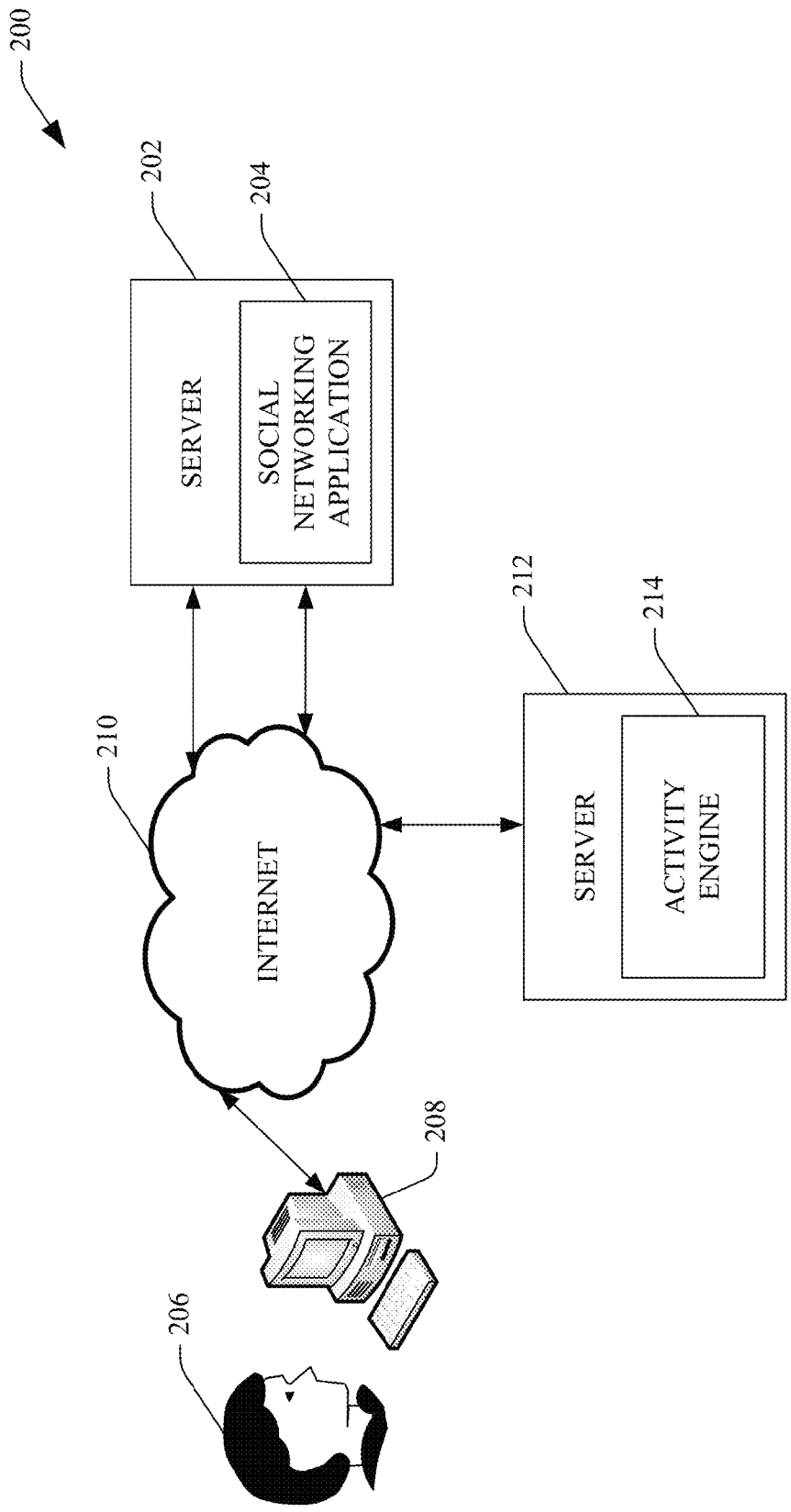
FIG. 2 is a functional block diagram of an example system that facilitates provision of activities based upon social messaging data.

Referring now to FIG. 2, an example system 200 that facilitates providing activities to be displayed in conjunction with social networking data is illustrated. The system 200 includes a server or servers 202 that are utilized in connection with providing a social networking application 204 to Internet users.

The server 202 may thus retain social networking data pertaining to an individual. An individual 206 can utilize a computing device 208 to access the social networking application 204 via the Internet 210. For instance, the individual 206 may provide user authentication data to the social networking application 204 by way of the Internet 210.

Upon receiving the indication that the individual 206 desires to log into the social networking application 204, the social networking application 204 can cause social networking data to be transmitted to a separate server 212 that houses an activity engine 214 (e.g., the receiver component 114, the extractor component 116, the activity generator component 118, and the data store 120 shown in FIG. 1). The activity engine 214 can mark up the social networking data as described above and then transmit such marked up data back to the social networking application 204 via the Internet 210. When the individual 206 views the social networking data on the computing device 208, the individual 206 will see the activities corresponding to such social networking data. While the activity engine 214 is shown as being separate from the social networking application 204, it is to be understood that in an example embodiment the social networking 204 may be configured to include the activity engine 214.

Figure 3:
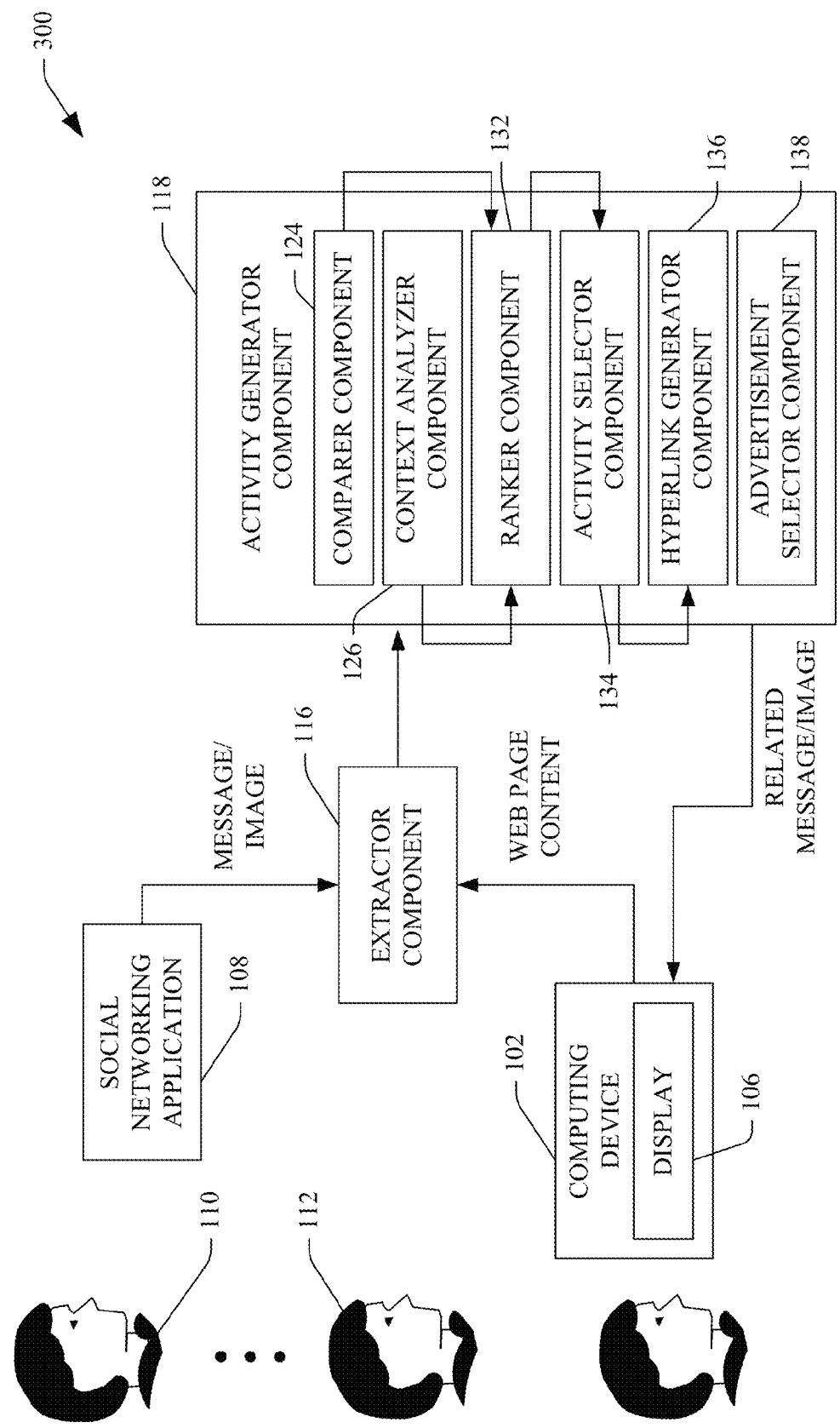
FIG. 3 is a functional block diagram of an example system that facilitates display of social networking data in conjunction with web content being viewed by an individual.

Referring now to FIG. 3, an example system 300 that facilitates providing an individual with a social networking message that is related to content being viewed by the individual in a browser is illustrated. As will be described below, components of the system 300 operate on different data than what has been described above with respect to the system 100 (FIG. 1). Specifically, the extractor component 116 can extract an entity from content of a web page and may also extract an entity from social networking data. The system 300 includes the computing device 102 that is utilized by the individual 104 to browse the Internet. In the example system 300, the individual 104 need not be viewing a web page that corresponds to the social networking application 108. Rather, the individual 104 may direct the browser to any suitable web page that is desirably viewed by the individual 104. One of the individuals 110-112 may generate a social networking message that is desirably received by the individual 104 via the social networking application 108.

The extractor component 116 reviews content of the web page being viewed by the individual 104 as well as social networking messages (which may include images) that are intended for the individual 104 via the social networking application 108. As described generally above, the extractor component 116 can extract one or more entities from the web page being viewed by the individual 104 and can additionally extract one or more entities from social networking messages intended for the individual 104 by way of the social networking application 108. Extraction of entities will be described in greater detail below.

If, for example, an entity extracted from the web page viewed by the individual 104 is sufficiently related to one or more entities extracted from messages received via the social networking application 108, such social networking message can be displayed in connection with the web page content (e.g., in a non-obtrusive manner). Display of social networking messages in connection with related web page content being viewed by an individual is described in U.S. patent application Ser. No. 12/614,457, entitled "Social Browsing", and filed on Nov. 9, 2009, the entirety of which is incorporated herein by reference.

If it is determined that a social networking message is desirably displayed in conjunction with the web page being viewed by the individual 104, then the activity generator component 118 can act as described above to display an activity in conjunction with the social networking message displayed to the individual 104 on the display 106. In an example, the comparer component 124 can compare an entity extracted from the web page content with one or more predefined activities and can output an indication of how closely related such entity is to the one or more predefined activities. The context analyzer component 126 can analyze context corresponding to the web page and the ranker component 132 can rank activities based at least in part upon the comparison undertaken by the comparer component and the context analyzed by the context analyzer component 126. Thereafter, the activity selector component 134 can select an activity based at least in part upon the rank of activities as output by the ranker component 132. The hyperlink generator component 136 can generate a hyperlink that can be used to represent the activity selected by the activity selector component 134.

Additionally or alternatively, the activity generator component 118 can analyze one or more entities extracted from the social networking message that is desirably displayed in conjunction with the content of the web page. That is, the comparer component 124 can compare one or more entities extracted from the social networking messages with one or more predefined activities. Further, the context analyzer component 126 can analyze context pertaining to the social networking message such as historical conversations between the sender and the recipient of the message. Based at least in part upon the comparison undertaken by the comparer component 124 and the context analyzed by the context analyzer component 126, the ranker component 132 can output a ranking of activities with respect to the social networking message in general and/or the extracted entity in particular. The activity selector component 134 may then select an activity that is desirably provided to the individual 104 based at least in part upon the ranking output by the ranker component 132. Thereafter, the hyperlink generator component 136 can represent the activity through use of a hyperlink as described above.

Furthermore, the advertisement selector component 138 may optionally select an advertisement to be displayed to the individual 104 in conjunction with the social networking message and/or the selected activity.

Figure 4:
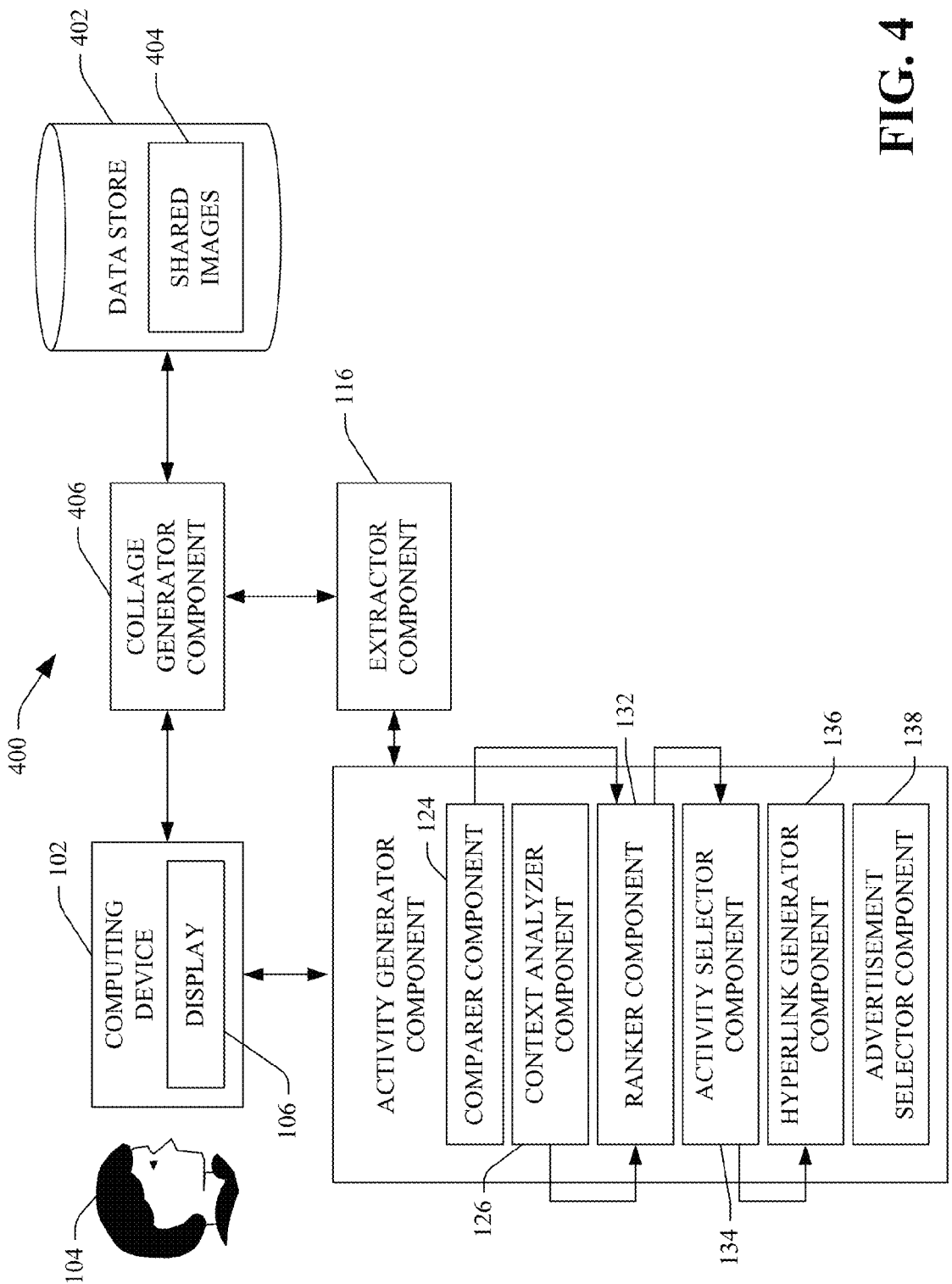
FIG. 4 is a functional block diagram of an example system that facilitates automatically generating a collage of images.

Now referring to FIG. 4, an example system 400 that facilitates providing activities with respect to images shared with the individual 104 is illustrated. The system 400 comprises a data store 402 that retains a plurality of images 404 that are desirably shared with the individual 104. For instance, the individual 104 may be a member of a photo sharing social networking application and contacts of the individual 104 can share such images 404 with the individual 104. In another example, the shared images 404 may be images provided via a conventional social networking web site, wherein the images correspond or are provided by contacts of the individual 104 as defined in the social networking application.

A collage generator component 406 can have access to the shared images 404 and can generate a collage of images that comprise at least a subset of the shared images 404. The collage generator component 406 may select images to include in the collage based upon any suitable metrics including recency of the images, whether the individual 104 has previously reviewed the images, how often the individual 104 views such images, location pertaining to the images 404, etc.

The extractor component 116 can be configured to extract at least one entity from one or more of the images selected to be included in the collage by the collage generator component 406. In an example, the extractor component 116 can analyze captions provided to images by owners of the images, metadata corresponding to the images (such as tags assigned to the images by viewers of such images), location data pertaining to the images (e.g., provided by GPS included in a camera used to capture the images), an image signature extracted from one or more images (e.g., a signature that indicates that the photograph pertains to a certain object or geographic region, etc.), and/or the like, and can extract an entity based at least in part upon such features. Once the extractor component 116 has extracted an entity with respect to an image, the comparer component 124, the activity generator component 118, the context analyzer component 126, the ranker component 132, and the activity selector component 134 can operate as described above.

The hyperlink generator component 136 may generate a hyperlink that is representative of the activity and associate such hyperlink with the image in the collage generated by the collage generator component 406. In an example, the hyperlink may be the image itself or a portion of the image. In another example, the hyperlink may be hidden until the individual 104 selects the image, in which case the hyperlink may be displayed as an inline popup (and may be displayed with other data pertaining to the image). The individual 104 may then select the hyperlink which can cause a search engine to undertake a search pertaining to the activity, such as locating additional information pertaining to the entity extracted from the image by the extractor component 116, locating items available for purchase that pertain to the entity extracted by the extractor component 116, or the like. Additionally or alternatively, the advertisement selector component 138 can optionally select an advertisement to be displayed in conjunction with the image.

The collage generated by the collage generator component 406 may be used as a home page for the individual 104 such that then the individual 104 logs in to a browser, such collage of images is provided to the individual 104. In another example, the collage of images may be a customized search engine page such that when the individual 104 accesses a particular search engine, the collage of images is provided to such individual 104. The individual 104 may then choose to cause the search engine to execute a search based upon a query or may cause the search engine to perform an activity pertaining to a hyperlink displayed in conjunction with one or more of the images in the collage.

Figure 5:
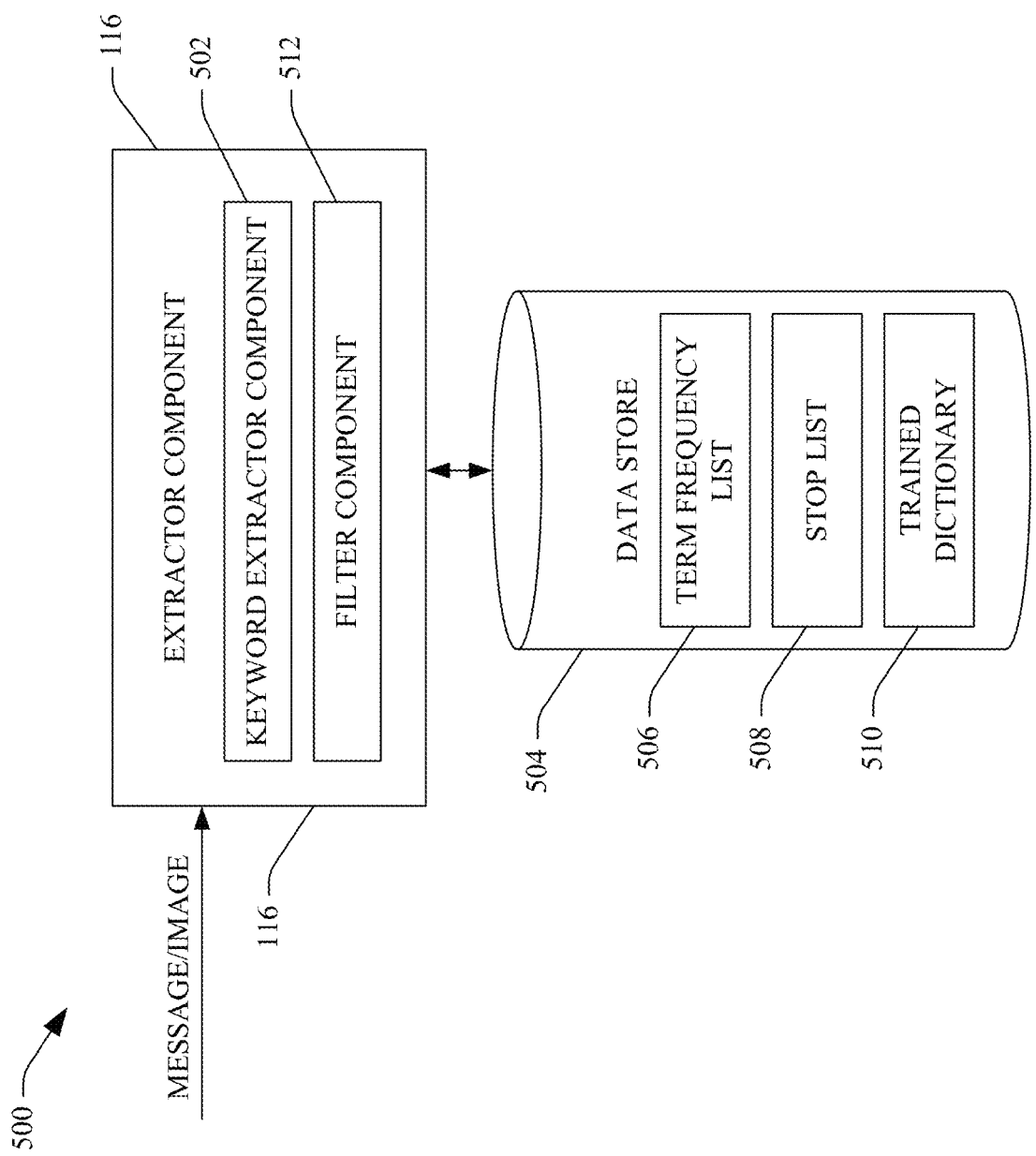
FIG. 5 is a functional block diagram of an example system that facilitates extracting an entity from social networking data.

Now referring to FIG. 5, an example system 500 that facilitates extracting an entity from social networking data (e.g., a social networking message or shared image) is illustrated. The extractor component 116 receives social networking data, for example, from a social networking application. The extractor component 116 comprises a keyword extractor component 502 that can extract a keyword from the social networking data. The system 500 additionally includes a data store 504 that comprises a term frequency list 506, a stop list 508 and a trained dictionary 510. The keyword extractor component 502 can access the term frequency list 506 when choosing a keyword to extract from the social networking data. The term frequency list 506 may include data indicative of how often certain terms occur. The frequency of use may be frequency of use of terms in search queries, frequency of use of terms on certain types of web pages, etc. If the term is relatively common, then the keyword extractor component 502 can choose not to extract a particular term (e.g., "the," "and," etc.). The keyword extractor component 502 may also access the stop list 508 when determining whether to extract a particular keyword. The stop list may include words that are desirably not extracted by the keyword extractor component 502.

The extractor component 116 may additionally comprise a filter component 512 that filters out social networking messaging data that is profane, for example. Thus, the filter component 512 can search for keywords or combinations of words that may in some way be offensive to the individual 104. If a message is deemed to be profane, it may not be displayed to the individual 104.

Once a keyword has been extracted, the extractor component 116 can analyze the keyword and context associated with such keyword and access the trained dictionary 510 to disambiguate between meanings of a keyword and ascertain a canonical meaning pertaining to the extracted keyword. In an example, this allows the extractor component 116 to disambiguate between the state of Washington, Washington, D.C. and George Washington. Additionally, the extractor component 116 can determine a canonical meaning of the term "Washington", which may be "President Washington." The extractor component 116 can utilize any suitable extraction technique together with, or as an alternative to, the extraction technique described herein and any such extraction is contemplated by the inventors and intended to fall under the scope of the hereto-appended claims.

Referring now to FIG. 6, an example graphical user interface 600 is depicted. The graphical user interface 600 may include an image 602 that can identify a sender of social networking data which may be a message, a photograph, video, or other suitable data. For example, the image 602 may be an image of the sender, an avatar that identifies the sender, etc. The graphical user interface 600 may also comprise a title 604 which can be a title assigned by the sender of the social networking data to such social networking data. In another example, the title 604 may be automatically assigned through use of keyword extraction. In still yet another example there may be no title. The graphical user interface 600 also comprises message content 606 which can be text, images, video, a combination of text, video and images, etc. An activity 608 can be shown in conjunction with the message content 606, wherein the activity may be in the form or represented as a hyperlink. The viewer of the message content 606 may select the hyperlink that represents the activity 608 and selection of such hyperlink may cause a search engine to perform a particular task that is associated with the activity 608. The graphical user interface may additionally include an advertisement 610. In an example, the advertisement 610 may be an advertisement that is approved by the sender of the social networking data such that the viewer can trust that the advertisement is for a product or service the individual may like. In another example, the advertisement 610 may be placed based upon keywords in the message content 606 or other suitable mechanisms.

As indicated above, providing the activity 608 with the message content 606 can provide additional context pertaining to the message content 606 to the viewer of the social networking data. Oftentimes, messages transmitted via social networking applications are relatively short. Thus, the activity 608 may be used to provide the viewer with additional context pertaining to the message content 606. For example, the activity 608 may be "learn more about xxxx" wherein xxxx is an entity extracted from the message content 606.

With reference now to FIG. 7, an example graphical user interface 700 is illustrated. In this example, the graphical user interface 700 comprises an image 702 that is shared with an individual by a contact thereof. Such image 702 may have a caption assigned thereto, may have metadata corresponding thereto, tags assigned thereto, etc. In this example, an individual can select the image 702 through utilization of a mouse pointer 704. For instance, the individual may use the mouse pointer 704 to select the image 702 with a left click, a right click, etc. In another example, the individual may use the mouse pointer 704 to hover over the image 702 for a particular amount of time. Once the individual has selected the image 702, an inline popup 706, for instance, may be presented in conjunction with the image 702. The inline popup 706 may include data pertaining to an image (e.g., retrieved from a particular web site corresponding to the image). Additionally, the inline popup 706 may include an activity 708 which can be selected as described above. As indicated above, the activity 708 may be represented as a hyperlink, the selection of which directs the individual to a search engine which executes a task pertaining to the activity. In another example, rather than displaying the activity in an inline popup 706, the activity may be displayed below the image 702, beside the image 702 or in some other place that does not obstruct the view of the individual with respect to the image 702. Still further, the activity 708 may be displayed without requiring the individual to select the image 702.

With reference now to FIG. 8, an example collage of shared images that is provided to the individual as a customized search engine home page is illustrated. The graphical user interface 800 can comprise a plurality of images 802-818. The graphical user interface 800 may further comprise a search field 820, wherein the individual can enter text that causes a search engine to execute a search. A button 822 corresponds to the search field such that the individual can select the button 822 to initiate the search for a query entered into the search field 820.

Each of the images 802-818 displayed to the individual can be images shared with such individual by for instance, contacts of the individual on a social networking application. Thus, if there are a sufficient number of images, each time the individual accesses the search engine the individual may be provided with a different collection or arrangement of images.

The individual may utilize a pointer 824 to select one of the images 802-818. In the example depicted in FIG. 8, the pointer 824 is utilized to select the image 816. Upon the individual selecting such image 816, the individual can cause the search engine to execute a search pertaining to an entity extracted from such image 816. For example, the image 816 itself or a portion thereof can act as a hyperlink. In another example, selection of the image 816 can cause an inline popup to be displayed to the individual, where the inline popup may depict details pertaining to the image 816 as well as an activity that pertains to an entity extracted from the image 816.

With reference now to FIG. 9, an example graphical user interface 900 that illustrates entities in the content of a web page that have social networking messages related thereto, is depicted. The graphical user interface 900 may comprise text that is indicative of a title of an article, an image corresponding to the article and text of the article. As can be ascertained, entities 902, 904, 906 and 908 have been extracted from the content of the web page and have been found to have social networking messages relating thereto, wherein the social networking messages can be posted to a social networking application by a member of the social network of the individual viewing the web page. In another example, the individual may wish to receive updates from the general public with respect to a particular topic via a social networking application. For instance, a member of the general public may write a comment about a particular location and the individual may wish to receive comments pertaining to such location. In this example, the poster of the message is not in the social network of the individual but the individual still desires to receive such information.

As can be seen in this example figure, text is bolded and underlined to indicate that a social networking message is related to such underline/bolded text. There are, of course, other manners for highlighting content of the web page including altering color of text/images, causing a box to be displayed around entities, etc. Additionally it can be ascertained that there is nothing obstructing the entity/text from view of the individual. Thus, if the individual does not care to view social networking messages, the individual can read over the content of the web page.

Figure 10:
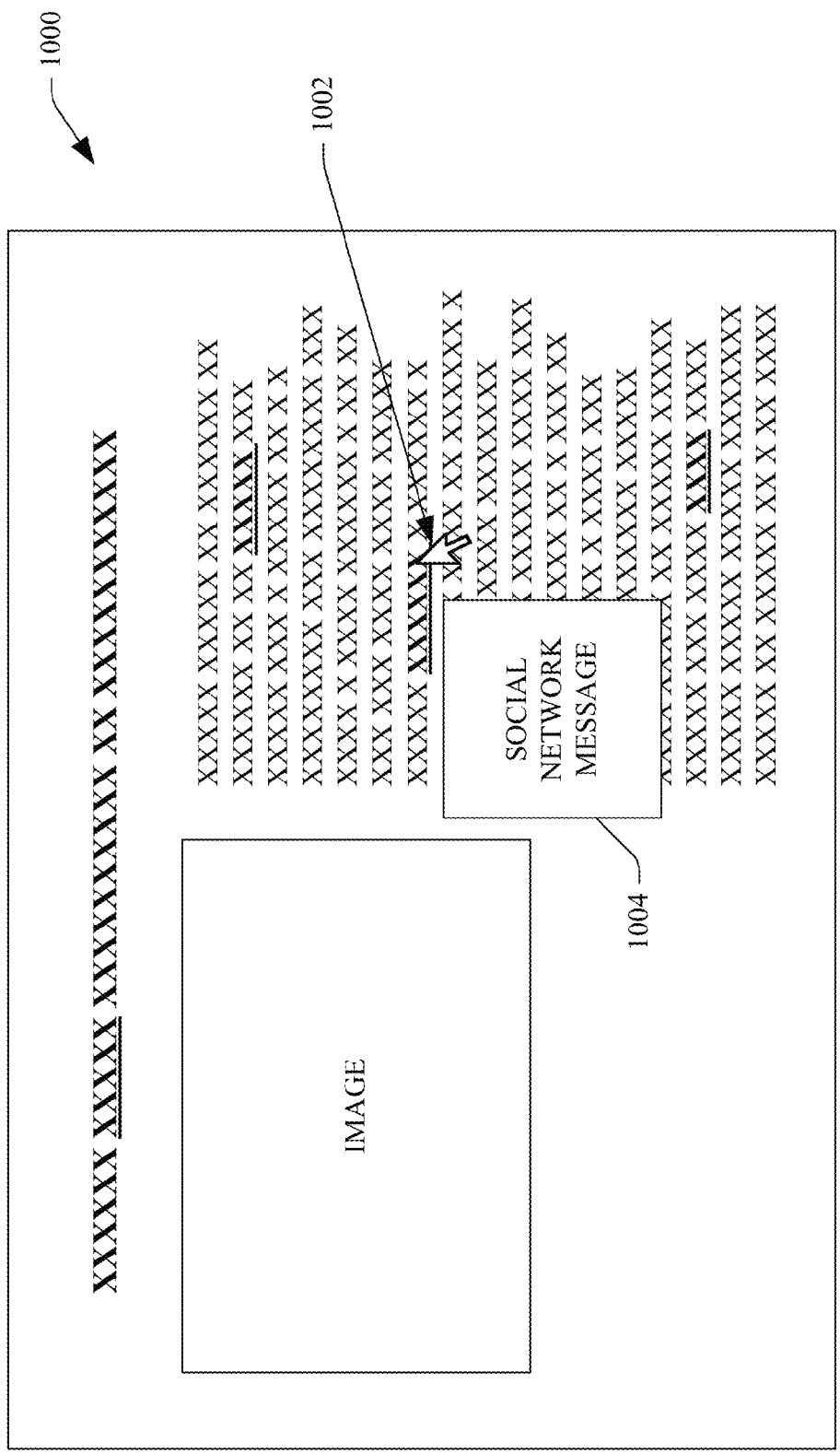
FIG. 10 is an example graphical user interface that displays a social networking message to an individual when such individual selects content on a web page that is related to the social networking message.

Now referring to FIG. 10, an example graphical user interface 1000 that displays a social networking message upon selection of a highlighted entity is illustrated. As can be ascertained, the highlighted entity 906 is selected by an individual through an input gesture of the individual such as the utilization of a mouse pointer 1002. As described above, selection through use of the mouse pointer 1002 can be a left click, a right click, a center button click, a hover over the highlighted entity 906 for a certain period of time, etc. Once it is ascertained that the individual has selected the highlighted entity 906, a corresponding social networking message that was found to be related to the highlighted entity 906 is presented to the individual. Other social networking messages may be presented to the individual if the individual selects other highlighted entities in the web page.

As shown in FIG. 10, the social networking message 1004 may be presented to the individual as an inline popup that may at least partly obstruct contents of the web page. In another example, the social networking message 1004 may be displayed in a toolbar of a browser, such that no content of the web page is obstructed. In yet another example, the social networking message 1004 may be displayed in a side bar. Of course other manners for displaying a social networking message in conjunction with content of a web page that relates to the social networking messages are contemplated and are intended to fall under the scope of the hereto appended claims.

Figure 11:
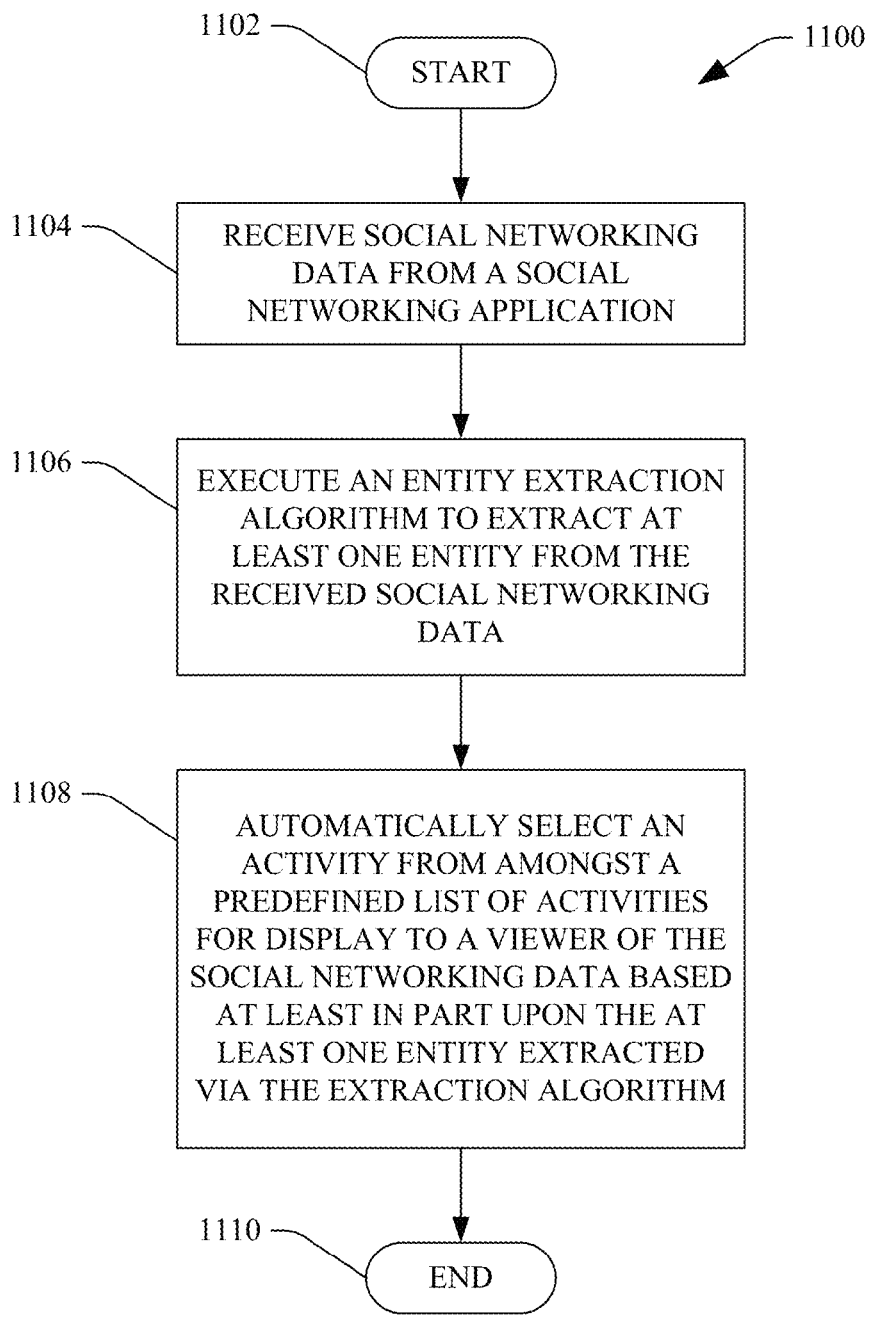
FIG. 11 is a flow diagram that illustrates an example methodology for automatically selecting an activity from a predefined list of activities based at least in part upon social networking data received by an individual.
Figure 12:
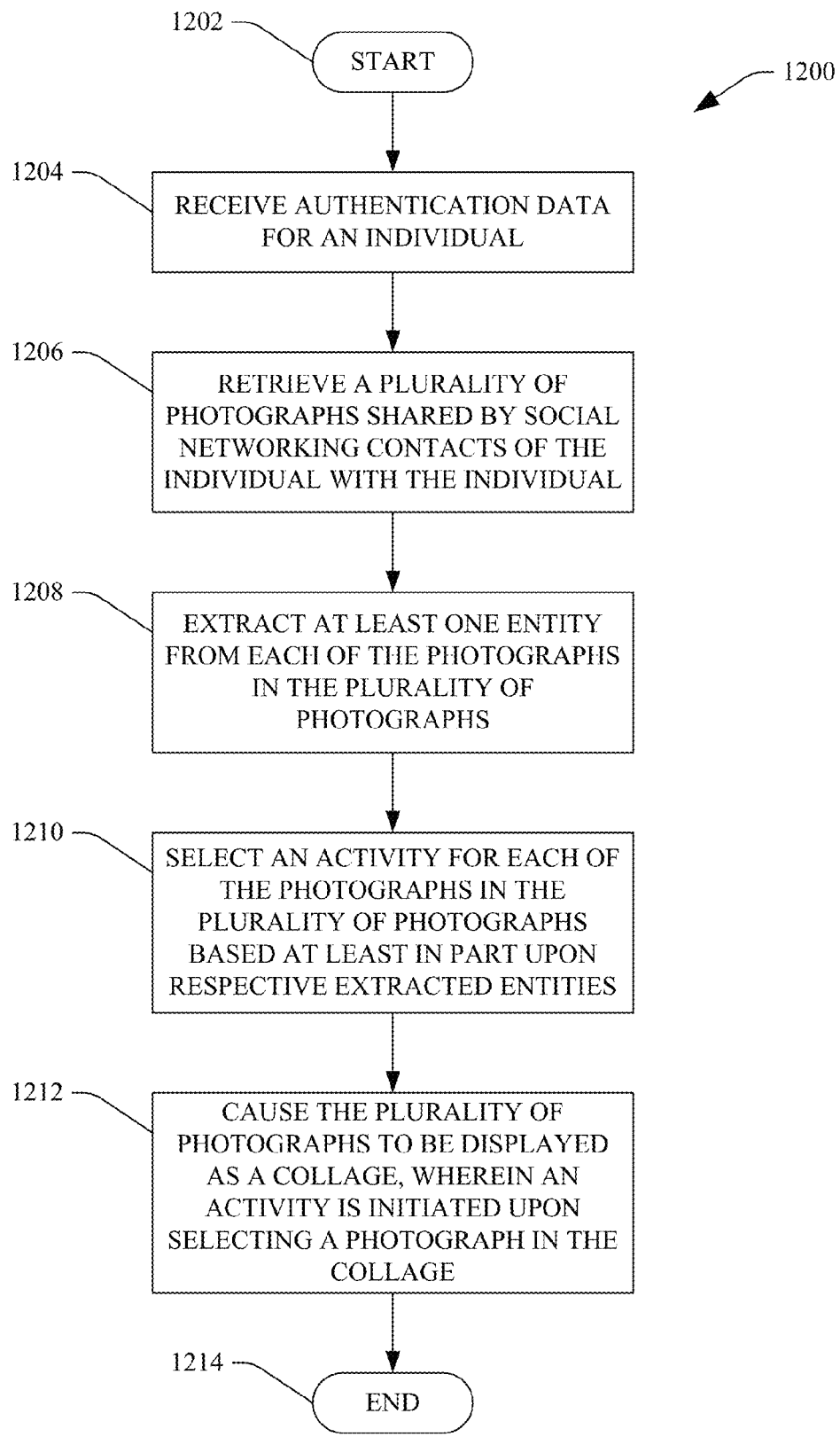
FIG. 12 is a flow diagram that illustrates an example methodology for causing a plurality of photographs shared with an individual to be displayed as a collage.
Figure 13:
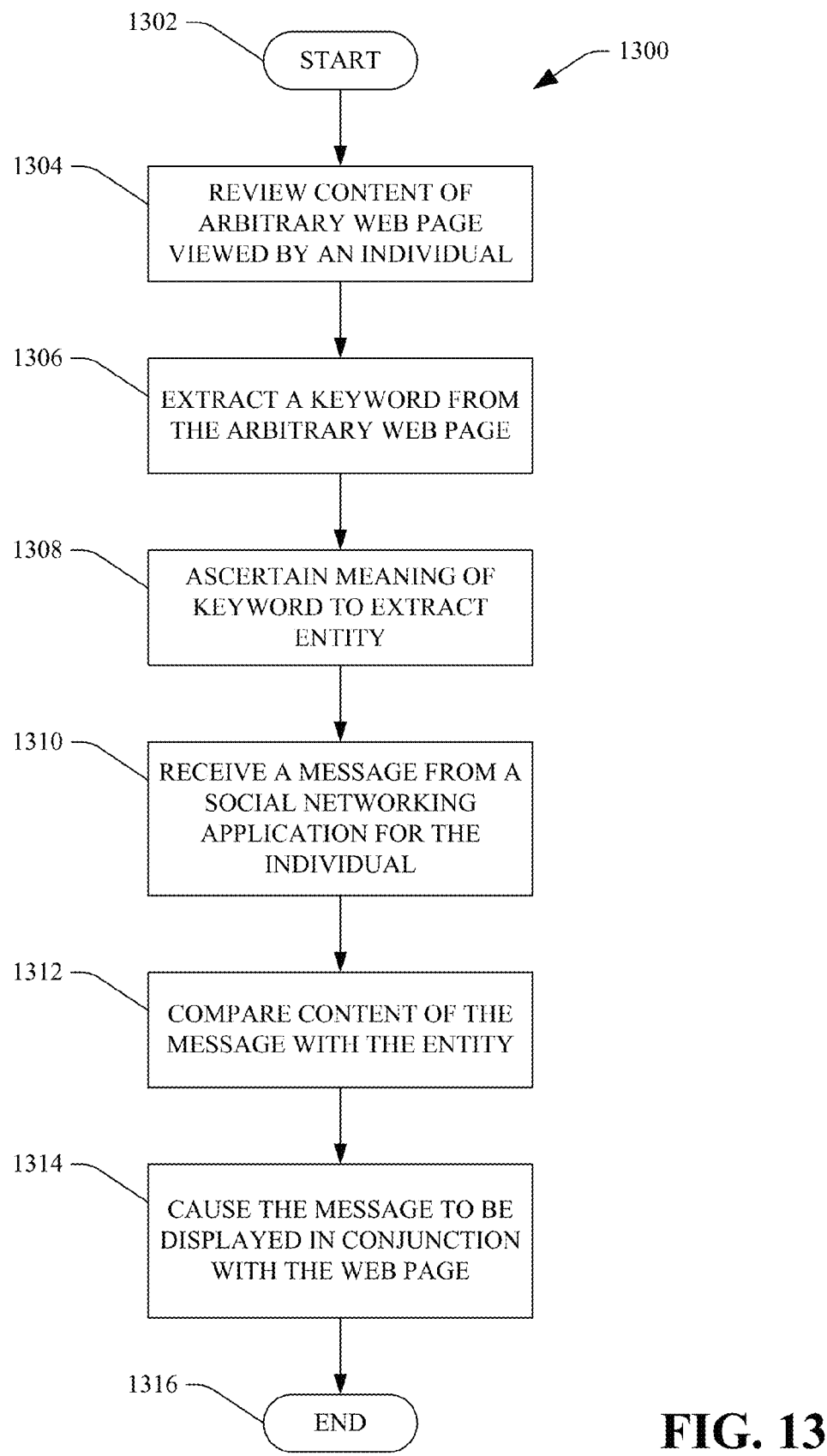
FIG. 13 is a flow diagram that illustrates an example methodology for causing a social networking message to be displayed in conjunction with related web content on a web page.

With reference now to FIGS. 11-13, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 11, a methodology 1100 that facilitates automatically causing an activity to be displayed in conjunction with a social networking message is illustrated. The methodology 1100 starts at 1102, and at 1104 data from a social networking application is received, wherein the data can be generated by a first individual. In an example, the first individual may be a contact of an intended recipient of the social networking data. Furthermore, as described above, the social networking data may be text, an image, a combination of text and image or other suitable data that can be shared via a social networking application.

At 1106, an entity extraction algorithm is executed to extract at least one entity from the received social networking data. At 1108, an activity is automatically selected from amongst a predefined list of activities for display to a viewer of the social networking data. The activity can be selected based at least in part upon the at least one entity extracted via the extraction algorithm at 1106. As indicated above, the activity can be selected based at least in part upon a comparison of the at least one entity extracted at 1106 and data pertaining to the activities in the predefined list of activities. For example, the entity may correspond to a certain category and an activity can be selected from the predefined list of activities based at least in part upon a comparison between such category and a category pertaining to the activity.

In a particular example, the activity can be displayed to the individual by automatically causing a hyperlink to be displayed on a computing device utilized by the viewer of the social networking data, wherein the hyperlink is representative of the activity. The hyperlink can be configured to direct the viewer of the social networking data to a search engine and may be further configured to cause a search engine to execute a search that pertains to the activity (and thus pertains to the at least one entity extracted at 1106). The methodology completes at 1110.

With reference now to FIG. 12, an example methodology 1200 that facilitates displaying a plurality of photographs in the form of a collage is illustrated. The methodology 1200 starts at 1202, and at 1204 authentication data is received with respect to an individual. This authentication data may be, for instance, a user name and password or other suitable authentication data.

At 1206, a plurality of photographs shared by social networking contacts of the individual are retrieved. Such a plurality of photographs may be selected based upon any suitable criteria as described above.

At 1208, at least one entity is extracted from each of the photographs in the plurality of photographs retrieved at 1206. The entity may be extracted based at least in part upon captions assigned to photographs, location data pertaining to photographs, tags assigned to photographs, etc.

At 1210, an activity is selected for each of the photographs in the plurality of photographs based at least in part upon the respective entities extracted from such photographs. Accordingly, different photographs can have different activities selected therefore.

At 1212, the plurality of photographs are caused to be displayed as a collage. An activity corresponding to a photograph can be initiated upon the individual selecting the photograph in the collage. For example, selecting the photograph may cause the individual to be directed to a search engine and a search can automatically be performed. In another example, selection of the photograph may include hovering over such photograph, which may cause an inline popup to be displayed, wherein the inline popup comprises data pertaining to the photograph and/or a hyperlink representative of the activity selected for such photograph. The methodology in 1200 completes at 1214.

Referring now to FIG. 13, a methodology 1300 that facilitates causing a social networking message to be displayed in conjunction with content of an arbitrary web page is illustrated. The methodology 1300 begins at 1302, and at 1304 content of an arbitrary web page being viewed by an individual is reviewed/analyzed. At 1306, a keyword is extracted from the arbitrary web page. As described above, the keyword can be extracted through utilization of term frequency information and/or a stop list.

At 1308, a meaning of the keyword is ascertained based at least in part on context pertaining to the keyword. For example, a trained dictionary can be accessed and utilized to ascertain the meaning of the extracted keyword. As indicated above, the keyword and corresponding meaning can be referred to as an entity. At 1310, a message is received from a social networking application, wherein the message is from a member of a social networking of the individual and is intended to be transmitted to the individual from the poster of the message. The message can be received prior to the individual reviewing the web page or during the time that the individual is reviewing the web page. While not shown in the methodology 1300, one or more entities can also be extracted from the received social networking message.

At 1312, an entity extracted from the social networking message is compared with the entity extracted from the web page. At 1314, the message is caused to be displayed in conjunction with the web page based at least in part upon the comparison undertaken at 1312. The methodology 1300 completes at 1316.

Figure 14:
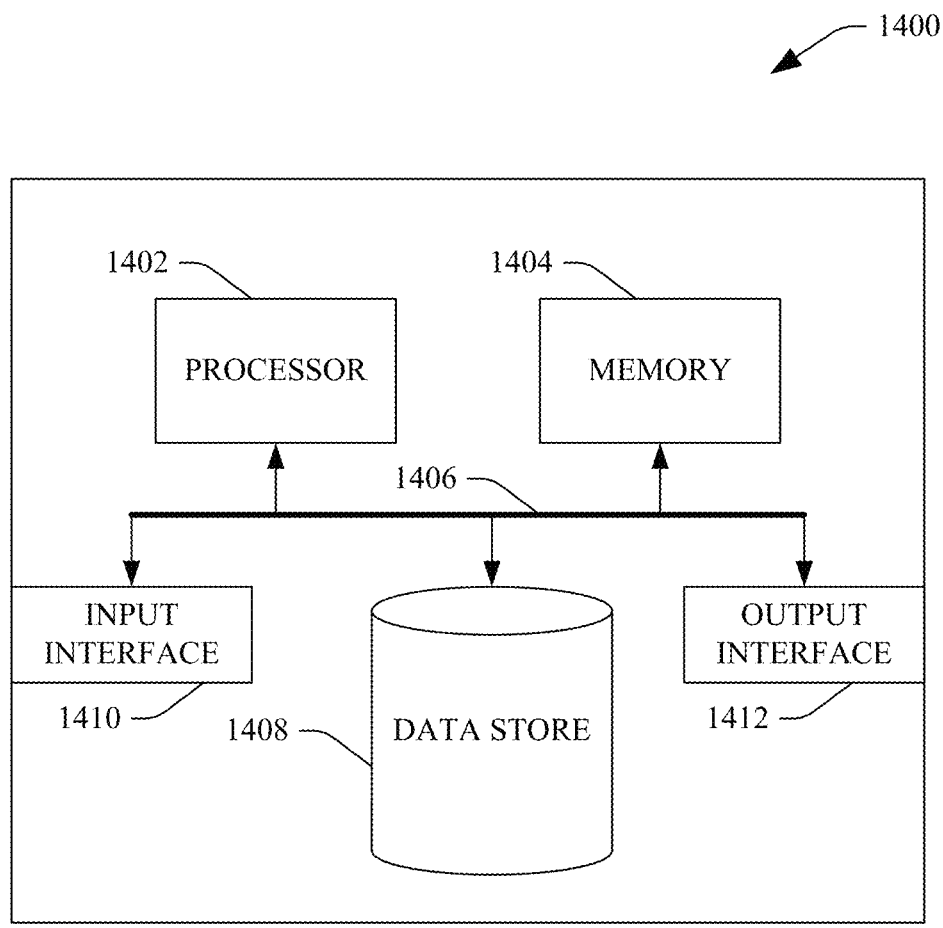
FIG. 14 is an example computing system.

Now referring to FIG. 14, a high-level illustration of an example computing device 1400 that can be used in accordance with the systems and methodologies disclosed herein is illustrated. For instance, the computing device 1400 may be used in a system that supports automatically selecting an activity for presentation to a user to be displayed in conjunction with social networking data. In another example, at least a portion of the computing device 1400 may be used in a system that supports provision of a photo collage to an individual. The computing device 1400 includes at least one processor 1402 that executes instructions that are stored in a memory 1404. The instructions may be, for instance, instructions for implementing functionality described as being carried out by one or more components discussed above or instructions for implementing one or more of the methods described above. The processor 1402 may access the memory 1404 by way of a system bus 1406. In addition to storing executable instructions, the memory 1404 may also store predefined activities, social networking messages, images, etc.

The computing device 1400 additionally includes a data store 1408 that is accessible by the processor 1402 by way of the system bus 1406. The data store 1408 may include executable instructions, predefined activities, templates used in connection with representing activities, etc. The computing device 1400 also includes an input interface 1410 that allows external devices to communicate with the computing device 1400. For instance, the input interface 1410 may be used to receive instructions from an external computer device, for an individual, etc. The computing device 1400 also includes an output interface 1412 that interfaces the computing device 1400 with one or more external devices. For example, the computing device 1400 may display text, images, etc. by way of the output interface 1412.

Additionally, while illustrated as a single system, it is to be understood that the computing device 1400 may be a distributed system. Thus, for instance, several devices may be in communication by way of a network connection and may collectively perform tasks described as being performed by the computing device 1400.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   receiving data from a social networking application, wherein the data is generated by a first individual;
   executing an entity extraction algorithm to extract an entity from the received data;
   selecting an activity from amongst a plurality of predefined activities based upon the entity; and
   causing a hyperlink to be displayed on a display of a computing device utilized by a second individual, wherein the hyperlink is based upon a template for the activity, the template comprises text describing the activity, the hyperlink comprising the text describing the activity and additional text that describes the entity, the hyperlink configured to cause a computer-executable application on the computing device to execute the activity responsive to receiving a selection of the hyperlink from the second individual.

2. The method of claim 1, wherein the social networking application is a text broadcasting application that is configured to broadcast a limited number of characters of text to subscribers of the first individual.

3. The method of claim 1, wherein the data from the social networking application is a status message update made by first individual, wherein the second individual is a contact of the first individual.

4. The method of claim 1, wherein the data from the social networking application is a caption or a title of a photograph shared by the first individual with the second individual.

5. The method of claim 1, wherein the data from the social networking application is geographic location metadata.

6. The method of claim 1, further comprising:
   analyzing content of a page currently being viewed by the second individual;
   determining that the content of the page is related to the entity;
   causing the data from the social networking application to be displayed in an inline popup on the page; and
   causing the hyperlink to be displayed in the inline popup together with the data from the social networking application.

7. The method of claim 1, further comprising:
   receiving an image, wherein the image is received from a contact of the second individual that chooses to share images with the second individual;
   extracting a second entity from the image; and
   causing at least a portion of the image to act as a hyperlink, wherein selection of the portion of the image by the second individual causes a search engine to execute a search pertaining to the second entity extracted from the image, and further causes search results retrieved during the search to be displayed on the display.

8. The method of claim 7, wherein the entity extracted from the image is indicative of a geographic location where the image was captured.

9. The method of claim 1, wherein the activity is one or more of the following:
   searching for additional information pertaining to the entity;
   searching for weather conditions pertaining to the entity;
   shopping for items pertaining to the entity;
   displaying a map; or
   displaying driving directions.

10. The method of claim 1, further comprising:
    comparing the entity with contents of a trained dictionary to determine a category that corresponds to the entity; and
    selecting the activity based at least in part upon the category that corresponds to the entity.

11. The method of claim 1, further comprising:
    analyzing historical correspondence of at least one of the first individual or the second individual; and
    selecting the activity based at least in part upon the analysis of the historical correspondence of the at least one of the first individual or the second individual.

12. The method of claim 1, further comprising transmitting the hyperlink to a web page or application that corresponds to the social networking application.

13. A system comprising:
    a processor; and
    a memory that comprises component that are executed by the processor, the components comprising:
      a receiver component that is configured to receive social networking data generated by a first individual, the social networking data generated through utilization of a social networking application;
      an extractor component that is configured to extract an entity from the social networking data, the entity being a keyword and a disambiguated canonical meaning thereof;
      a ranker component that, responsive to the extractor component extracting the entity from the social networking data, is configured to rank a plurality of predefined activities with respect to the entity;
      an activity selector component that is configured to select an activity for the entity form the plurality of predefined activities, wherein the activity selected by the activity selector component is ranked most highly in the plurality of predefined activities by the ranker component, and the activity is a search for information about the entity; and a hyperlink generator component that is configured to cause a hyperlink to be displayed in conjunction with the social networking data on a display of a computing device utilized by a second individual, wherein the hyperlink is configured to direct the second individual to a search engine upon the hyperlink being selected by the second individual, wherein the hyperlink is further configured to cause the search engine to execute a search for more information about the entity, and wherein the second individual is in a social network of the first individual.

14. The system of claim 13, further comprising:

an advertisement selector component that is configured to display an advertisement in conjunction with the social networking data, wherein the advertisement is recommended by a poster of the social networking data.

15. The system of claim 13, further comprising:

a transmitter component that is configured to transmit the hyperlink generated by the hyperlink generator component to the social networking application.

16. The system of claim 13, further comprising a display component that is configured to cause the hyperlink to be displayed on a web site that corresponds to the social networking application.

17. A computer-readable memory device comprising computer-executable instructions that, when executed by processor, cause the processor to perform acts comprising: receiving a social networking message posted via a social networking application by a first individual;

identifying an entity in the social networking massage, wherein the entity comprises: a keyword included in the social networking message; and an associated canonical meaning of the keyword; selecting and activity based upon the entity, wherein the activity is selected from amongst a finite number of defined activities; selecting a template based at least in part upon the selecting of the activity, the template comprising text that describes the activity; and causing a hyperlink to be displayed on a computing device utilized by a second user, the hyperlink comprising the keyword and the text that describes the activity from the template, the hyperlink displayed in conjunction with the social networking message to the second individual and, when selected by the second individual, configured to cause a search engine to be accessed, cause the search engine to execute a search pertaining to the activity when selected by the second individual, and cause search results retrieved by the search engine to be displayed.

18. The method of claim 1, wherein the activity is a search for information about the entity, and wherein the computer-executable application is directed to a search engine responsive to the second individual selecting the hyperlink.

19. The method of claim 1, wherein the entity is a keyword and a disambiguated canonical meaning thereof.

20. The system of claim 13, wherein the ranker component ranks the finite number of predefined activities based at least in part upon at least one of:

and identity of the second individual;

and identity of the social networking application;

and amount of time since the second individual reviewed, or was given an opportunity to review the social networking data; or a current geographic location of the second individual.

* * * * *